(12) United States Patent
Gray, Jr. et al.

(10) Patent No.: US 8,387,385 B2
(45) Date of Patent: Mar. 5, 2013

(54) EFFICIENT BYPASS VALVE FOR MULTI-STAGE TURBOCHARGING SYSTEM

(75) Inventors: Charles L. Gray, Jr., Pinckney, MI (US); David James Haugen, Ann Arbor, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 1538 days.

(21) Appl. No.: 11/173,920

(22) Filed: Jul. 1, 2005

(65) Prior Publication Data

US 2006/0042246 A1 Mar. 2, 2006

Related U.S. Application Data

(60) Provisional application No. 60/605,898, filed on Aug. 31, 2004.

(51) Int. Cl.
| | |
|---|---|
| *F02B 33/44* | (2006.01) |
| *F02B 37/00* | (2006.01) |
| *F02B 37/12* | (2006.01) |
| *F02B 37/16* | (2006.01) |
| *F02D 23/00* | (2006.01) |
| *F16K 31/44* | (2006.01) |
| *F16K 1/16* | (2006.01) |

(52) U.S. Cl. ............. 60/612; 60/602; 251/228; 251/298
(58) Field of Classification Search .................... 60/612, 60/602; 137/605; 415/38, 144; 251/228, 251/298; 417/356; F02B 37/00, 37/02, 37/16, F02B 37/18, 37/12
See application file for complete search history.

(56) References Cited

U.S. PATENT DOCUMENTS

| | | | | |
|---|---|---|---|---|
| 2,394,471 | A * | 2/1946 | Paul .............................. | 251/228 |
| 2,852,037 | A * | 9/1958 | Downing et al. ............. | 251/298 |
| 2,949,540 | A * | 8/1960 | Clayton ........................ | 417/356 |
| 3,035,408 | A * | 5/1962 | Silver ............................. | 60/602 |
| 3,334,858 | A * | 8/1967 | Hay .............................. | 251/298 |
| 3,361,070 | A * | 1/1968 | Fukasu et al. ................. | 415/144 |
| 3,576,102 | A * | 4/1971 | West ............................... | 60/612 |
| 3,602,603 | A * | 8/1971 | Fukasu et al. .................... | 415/38 |
| 4,244,395 | A * | 1/1981 | Griswold et al. .......... | 137/484.2 |
| 5,501,427 | A * | 3/1996 | Ando ............................ | 251/228 |
| 5,857,337 | A * | 1/1999 | Kawasaki ....................... | 60/602 |
| 6,112,523 | A * | 9/2000 | Kamo et al. .................... | 60/612 |

(Continued)

FOREIGN PATENT DOCUMENTS

| | | |
|---|---|---|
| DE | 37 31 320 A1 | 4/1988 |
| DE | 195 14 572 A1 | 10/1996 |

(Continued)

*Primary Examiner* — Thai Ba Trieu
(74) *Attorney, Agent, or Firm* — David H. Read (57) ABSTRACT

A turbocharger system includes first and second turbines arranged such that exhaust gas passes through the first turbine then the second turbine. A bypass channel is configured such that exhaust gas entering the channel passes only through the second turbine. A valve positioned in the bypass channel regulates the flow of gas therethrough. The valve accelerates a stream of gas and focuses the stream toward the second turbine such that a large part of the added velocity of the stream is preserved as it enters the second turbine. Operation of the valve may be controlled so as to maintain the valve in a closed position while exhaust gas pressure above the first turbine pressure is below a first threshold, to progressively open the valve as the pressure increases above the first threshold, and to maintain the valve in a full-open position while the pressure is above a second threshold.

31 Claims, 10 Drawing Sheets

U.S. PATENT DOCUMENTS

| | | | |
|---|---|---|---|
| 6,311,493 B1 * | 11/2001 | Kurihara et al. | 60/612 |
| 6,318,086 B1 * | 11/2001 | Laustela et al. | 60/612 |
| 6,651,432 B1 | 11/2003 | Gray, Jr. | 60/605.2 |
| 6,751,956 B2 * | 6/2004 | Mayer et al. | 60/602 |
| 2003/0115875 A1 | 6/2003 | Sumser et al. | 60/605.2 |
| 2006/0042247 A1 * | 3/2006 | Haugen | 60/612 |
| 2007/0062190 A1 * | 3/2007 | Melchior | 60/612 |

FOREIGN PATENT DOCUMENTS

| | | |
|---|---|---|
| DE | 19853360 A1 | 5/2000 |
| DE | 102 22 919 A1 | 12/2003 |
| FR | 2 496 758 | 6/1982 |
| GB | 2043771 A * | 10/1980 |
| GB | 2 110 755 A | 6/1983 |
| GB | 2110755 A * | 6/1983 |
| JP | 61164039 A * | 7/1986 |
| JP | 1-190920 | 8/1989 |
| JP | 2004-225619 A | 8/2004 |
| JP | 2005133651 A * | 5/2005 |
| WO | WO 2005073536 A1 * | 8/2005 |

* cited by examiner

Fig. 1
(Prior Art)

INTAKE    EXHAUST

EFFICIENT BYPASS VALVE FOR MULTI-STAGE TURBOCHARGING SYSTEM

CROSS-REFERENCE TO RELATED APPLICATION

This application claims the benefit under 35 U.S.C. §119 (e) of U.S. Provisional Patent Application No. 60/605,898 filed Aug. 31, 2004, where this provisional application is incorporated herein by reference in its entirety.

BACKGROUND OF THE INVENTION

1. Field of the Invention

The invention disclosed herein is generally related to turbocharger systems for internal combustion engines, and in particular, to multi-stage turbochargers having bypass systems for diverting exhaust gas flow around a first turbine.

2. Description of the Related Art

Turbocharging systems, such as for use with internal combustion engines, are well known in the art. A turbocharger comprises an exhaust gas turbine coupled to an intake charge compressor. The turbine operates by receiving a stream of exhaust gas from an internal combustion engine and converting a portion of the energy in the exhaust gas stream into mechanical energy by passing the exhaust stream over blades of a turbine wheel, and thereby causing the turbine wheel to rotate. This rotational motion is then utilized by a compressor, coupled by a shaft to the turbine wheel, to compress a quantity of air to a pressure higher than air entering at its inlet, which then provides an increased amount of air available to be drawn into the internal combustion engine cylinders during the engine's intake stroke. The additional compressed air (boost) taken into the cylinders can allow more fuel to be burned within the cylinder, and thereby offers the opportunity to increase the engine's power output.

The turbine in a turbocharger is sometimes referred to as a gas expander. This is because the turbine essentially converts some of the energy represented by a pressure differential between gas in the exhaust stream and ambient pressure into mechanical energy, in the form of rotation of the turbine and compressor. As the gas in the exhaust stream loses pressure, it expands and loses potential energy.

In a turbocharged internal combustion engine system, the wide range of speed and power output levels at which the internal combustion engine may operate presents challenges for designing an appropriately matched turbocharging system with good mechanical efficiency for working with the engine. For example, while smaller turbochargers provide boost quickly and more efficiently at lower engine speeds, larger turbochargers provide boost more effectively at higher engine speeds. Because of the relatively narrow flow range over which a turbocharger operates efficiently, relative to the broad flow range generated by internal combustion engines, it is known in the prior art (e.g., in cases of high boost need), to provide a multi-stage turbocharging system, involving both a smaller (i.e., "high-pressure") turbocharger and a larger (i.e., "low pressure") turbocharger, wherein the smaller high-pressure turbocharger operates at lower engine speeds and the larger low pressure turbocharger takes over at higher engine speeds. It has been found valuable to switch between the two turbocharging stages through use of a bypass system to divert exhaust gas flow around the high-pressure turbocharger to the low-pressure turbocharger as needed.

Bypassing exhaust flow around a turbine is also well known in the art. Typically, turbine bypass systems are used in the prior art primarily to regulate system pressure across the high-pressure turbine, and can be operated by selectively bleeding off a portion of the upstream exhaust gas over a pressure drop through a bypass channel when backpressure caused by the turbine's operation causes the system pressure upstream of the high-pressure turbine to exceed desired levels. Bleeding of the exhaust gas to the bypass channel is generally controlled by a small regulating valve called a "wastegate" positioned in the bypass channel around the turbine. A typical wastegate valve operates somewhat like a trap door, opening a port in the bypass channel, upstream of the high-pressure turbine inlet to divert a portion of the exhaust flow around the turbine, with the bypassed exhaust flow naturally expanding over the pressure drop at the wastegate and in the passage through the bypass channel and then reuniting with the remaining exhaust flow downstream of the bypassed turbine.

Figure 1:
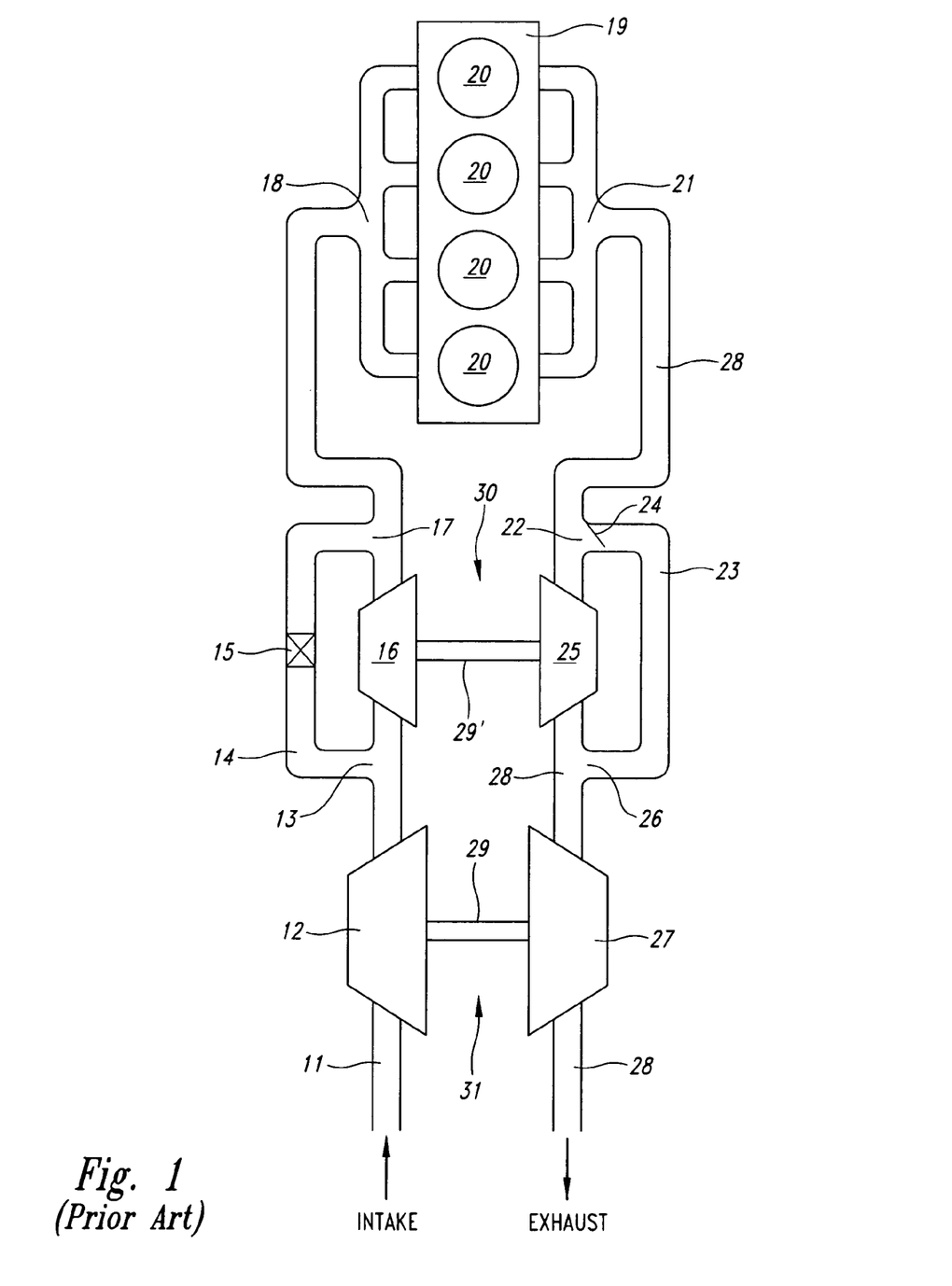
FIG. 1 is a schematic diagram of an internal combustion engine system with a multi-stage turbocharging system, according to known art.

FIG. 1 diagrammatically shows an internal combustion engine system with a multi-stage turbocharging and bypass system according to known art. Referring to FIG. 1, ambient air enters the system through intake line 11. The intake air may optionally be mixed with recirculated exhaust gas (EGR) to form a charge-air mixture. The ambient air or charge-air mixture flows through and is compressed by a first-stage low pressure air compressor 12.

After compression in compressor 12, the intake air may flow through a second-stage high-pressure air compressor 16 for further compression. Alternatively, the intake air may be diverted at port 13 to optional bypass channel 14 and returned to the intake line at port 17, as regulated by adjusting the opening or closing of optional bypass valve 15.

Intake air then enters the intake manifold 18 and into combustion chambers 20 of engine 19 through conventional valves (not shown) in a conventional manner. Following combustion in the combustion chambers 20, the warm, pressurized exhaust gases leave the combustion chambers 20, at a first, higher, exhaust gas energy level, through conventional valves (not shown) in a conventional manner, and flow from engine 19 through exhaust manifold 21 to exhaust channel 28.

After leaving the exhaust manifold 21, exhaust gas in exhaust channel 28 may flow through a high-pressure turbine 25. High-pressure turbine 25 in exhaust channel 28 is coupled to the high-pressure air compressor 16 in the intake line 11 through shaft 29', and together the turbine 25 and compressor 16 form a high-pressure turbocharger 30. A portion of the exhaust gas may be selectively diverted at port 22 to bypass channel 23 and returned to the exhaust line at port 26, as regulated by opening or closing of port 22 through operation of wastegate valve 24, which is operated (actively or passively) to open in response to system pressure buildup upstream of turbine 25.

Downstream of turbine 25, the exhaust gas at a second, lower exhaust gas energy level then flows through low pressure turbine 27 for further expansion, and then exits via exhaust channel 28. Turbine 27 in exhaust channel 28 is coupled to low pressure air compressor 12 in intake line 11 through shaft 29, and together the turbine 27 and compressor 12 form a low pressure turbocharger 31.

BRIEF SUMMARY OF THE INVENTION

According to an embodiment of the invention, a turbocharger system is provided, comprising a high-pressure turbine having an inlet and an outlet, a bypass channel having a first end in fluid communication with the inlet of the high-pressure turbine and a second end in fluid communication with the outlet of the high-pressure turbine and configured to allow bypass of flow around the high-pressure turbine, and a low pressure turbine having an inlet in fluid communication with the outlet of the high-pressure turbine and the second end of the bypass channel, and an outlet. The system also includes a valve positioned in the bypass channel configured to regulate flow of gaseous fluid in the bypass channel, the valve further configured to accelerate a stream of fluid passing therethrough and direct the stream toward the inlet of the low-pressure turbine such that a large part of the added velocity of the stream is preserved as it enters the low pressure turbine. The valve may be configured to function as a nozzle, focusing the stream of fluid.

An actuator is provided, configured to vary a geometry of the valve between a closed position, in which passage of fluid in the bypass channel is substantially blocked, to an open position, in which passage of fluid in the bypass channel is substantially unimpeded. A controller is also provided, configured to control the actuator in response to a level of fluid pressure at the inlet of the first turbine.

The controller and actuator are collectively configured to maintain the geometry of the valve in the closed position while the pressure at the inlet of the first turbine is below a first threshold, to progressively vary the geometry toward the open position as the pressure increases above the first threshold, and to maintain the valve in the open position while the pressure is above a second threshold.

According to an embodiment, an engine system is provided including a turbocharger.

According to another embodiment, a bypass valve is provided, including a valve body and a valve member. The valve body has a first passage extending between a first gas inlet and a gas outlet, and a second passage extending between a second gas inlet and the gas outlet. The first and second passages are configured such that gas streams entering the first and second inlets are combined into a single gas stream exiting the gas outlet. The valve member is actuable between a closed position, in which the valve member substantially blocks all gas flow in the second passage, and an open position in which gas flowing in the second passage is substantially unimpeded by the valve member, and is configured to direct gas flowing in the second passage in a substantially focused stream toward the outlet.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION OF THE INVENTION

In the following description, certain specific details are set forth in order to provide a thorough understanding of various embodiments of the invention. However, one skilled in the art will understand that the invention may be practiced without these details.

Embodiments of the invention described hereafter deal primarily with more efficient recovery of the energy of the exhaust gas stream of an internal combustion engine.

Referring again to FIG. 1, as previously explained, there is a drop in pressure across the high-pressure turbine 25 as the exhaust is expanded over the turbine while the turbine captures energy from the exhaust flow. Unfortunately, an equal drop in pressure occurs in the exhaust that flows between ports 22 and 26 on the bypass line 23, all of which is unrecovered exhaust energy. Most of this pressure drop occurs at the wastegate 24. The inventors have recognized that this pressure drop in the bypass channel 23 represents a loss of useful energy. This loss of energy can be most acute in a range of operation of the engine in which the wastegate 24 is partially open. In this range there is a significant pressure drop across the wastegate 24. For example, the high-pressure turbine 25 may be operating at or above its range of maximum efficiency and the low pressure turbine 27 may be operating somewhat below its range of maximum efficiency.

In the range of operation where the wastegate 24 is only partially open, the pressure drop across the wastegate 24 corresponds to an increased flow-rate, or velocity, as exhaust gases pass through the restricting passage of the gate. At the point where the pressure drops, an energy potential represented by the difference in pressure between the pressurized gases above and below the wastegate 24 is converted to turbulent kinetic energy in the gas flow. As the exhaust gases continue to travel down the bypass channel 23 to the port 26, they slow and lose the converted kinetic energy as they pass through the convolutions of the bypass channel 23 and port 26 and remix with the gases flowing from the high-pressure turbine 25. The inventors have determined that at least some of the energy lost in the bypass channel 23 and the wastegate 24 may be usefully reclaimed.

Figure 2:
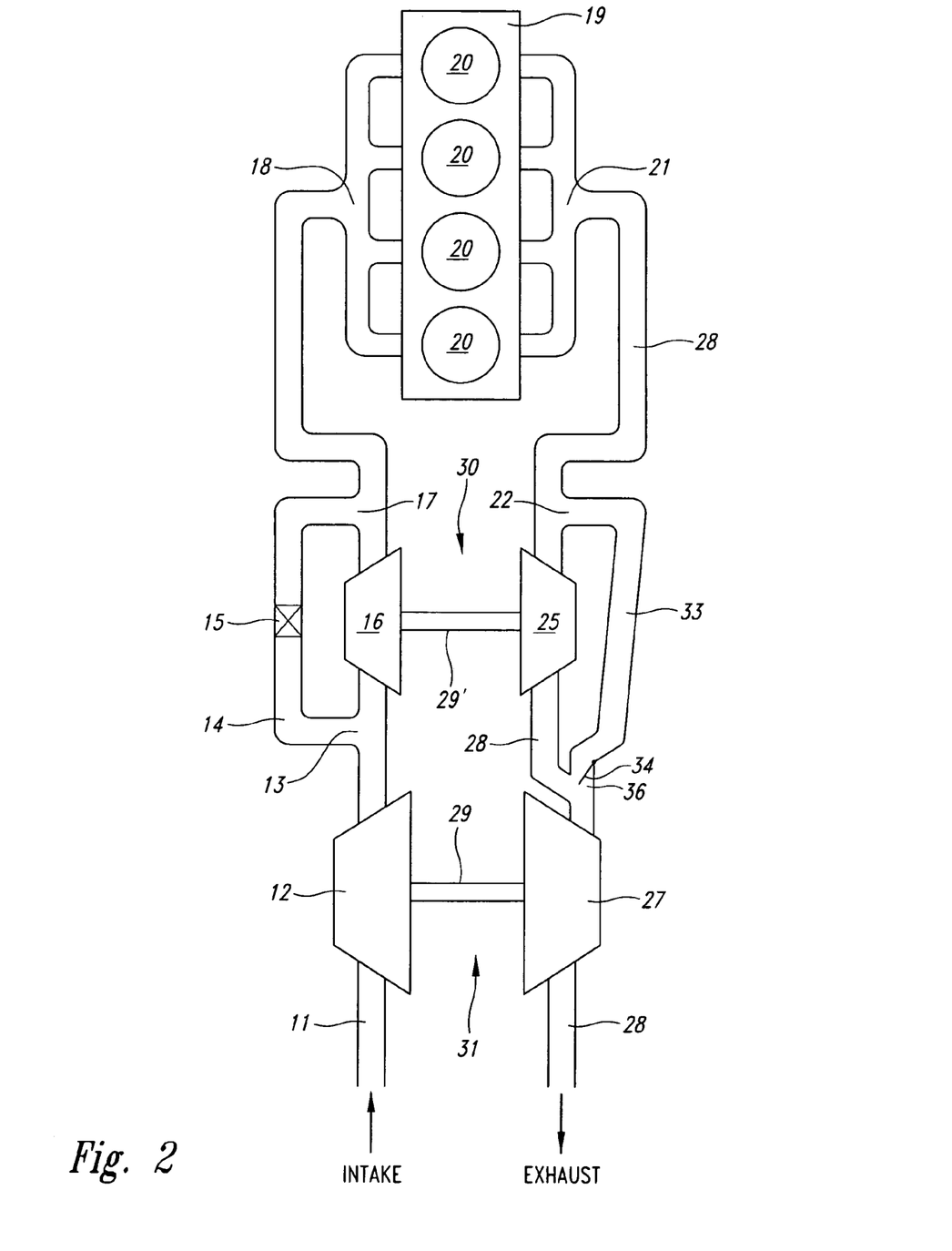
FIG. 2 is a schematic diagram of an internal combustion engine system with a turbocharging and bypass arrangement according to an embodiment of the present invention.

FIG. 2 illustrates a first embodiment of the invention. For ease of discussion in highlighting aspects of this embodiment over the prior art, the embodiment of FIG. 2 is presented herein as identical to FIG. 1 of the prior art in all respects (i.e., with identical components, numeration, system configuration and operation), except as hereafter described.

Referring to FIG. 2 in comparison to FIG. 1, it will be noted that certain changes from the prior art have been made with relation to the bypass system around high-pressure turbine 25. In FIG. 2, valve 34 regulates (e.g., through a pressure differential) the quantity of exhaust gas diverted from exhaust channel 28 through bypass channel 33 to port 36. A portion of the energy in the bypassed exhaust gas that is diverted through bypass channel 33 is converted from pressure to kinetic energy (velocity) by passing through valve 34, with valve 34 acting as a reduced cross-sectional area nozzle that accelerates and focuses the by-passed flow.

The accelerated flow exiting valve 34 is reunited with the flow from high-pressure turbine 25 in an orientation selected to preserve the available kinetic energy of the flow from the bypass channel 33, and to provide an efficient combined direction for the exhaust flows just prior to contacting the turbine wheel blades of turbine 27, as will be discussed in more detail hereafter. The accelerated flow is then converted, combined with the exhaust flow in exhaust channel 28, to a mechanical rotational energy by turbine 27.

By locating port 36 sufficiently near the turbine wheel blades of turbine 27, the accelerated and focused flow is not allowed to substantially dissipate energy before reaching the turbine wheel of turbine 27 for work extraction. In this manner, bypass channel 33 provides bypassing of pressurized exhaust gas from the engine 19 around the high-pressure turbine 25 to an inlet of the lower pressure stage turbine 27 by directing bypassed flow in a complementary flowing direction with the main exhaust flow just prior to making contact with the turbine wheel blades of turbine 27, regardless of whether port 36 comprises a direct inlet to turbine 27 or is a substantially equivalent return port to exhaust channel 28 just prior to turbine 27.

Valve 34 is represented in many of the figures as a simple flapper valve. This is for convenience only, and is not intended to limit the scope of the invention with respect to the structure of the valve. For example, valve 34 may open to form a flow path in the shape of a short tube with a taper or constriction (reduced cross-section) designed to speed up and direct the flow of exhaust gas such that the flow of high velocity exhaust gas from the valve 34 is focused directly into the low pressure turbine 27. Other examples of valve structures are discussed in more detail hereafter.

The term "focus," as used in this specification and claims, refers to the flow of exhaust gasses from a bypass valve, according to various embodiments of the invention, in which the gasses are substantially directed in a uniform and orderly flow, and in which momentum is increased and preserved. This is in contrast to the turbulent and undirected gas flow that commonly occurs at a typical wastegate.

Figure 3:
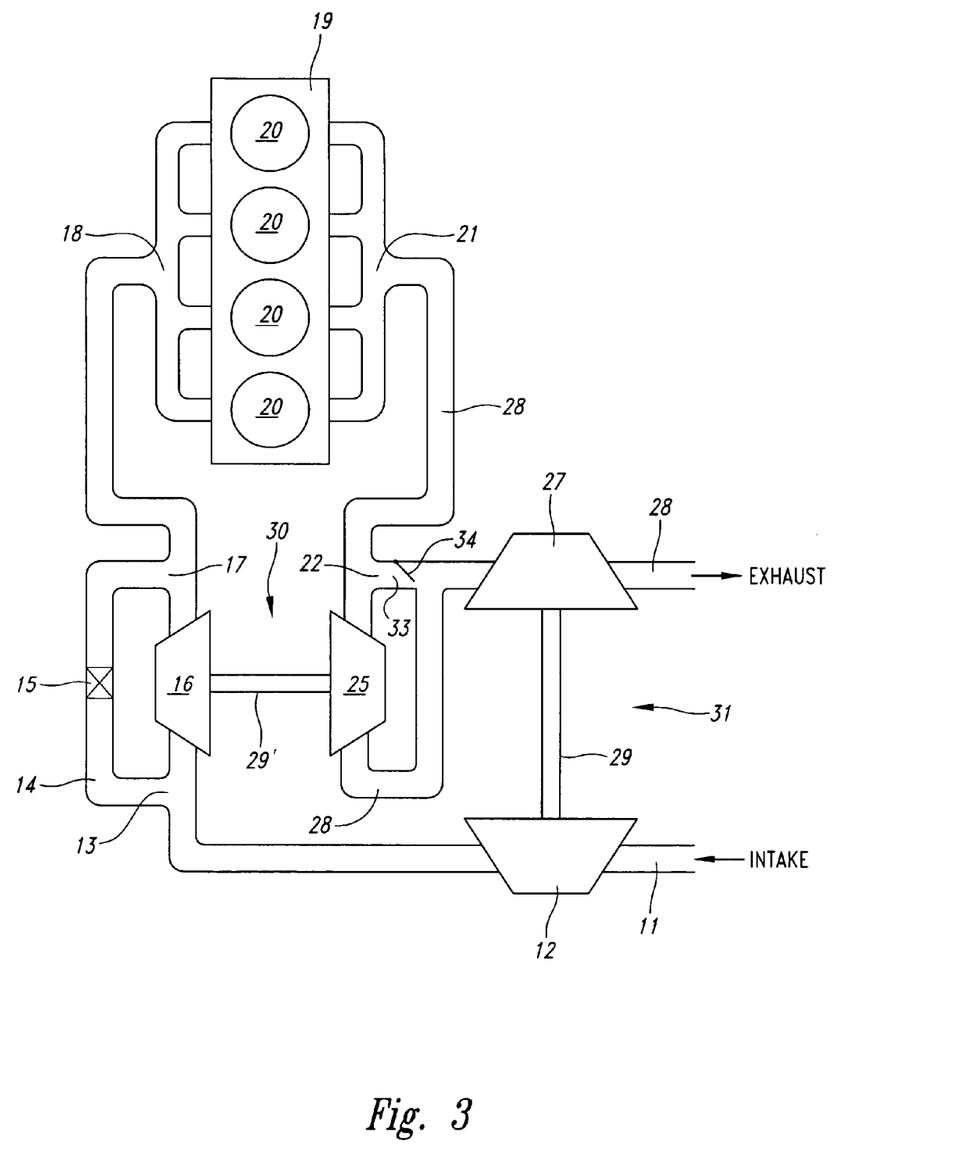
FIG. 3 is a schematic diagram of an internal combustion engine system with a turbocharging and bypass arrangement according to another embodiment of the present invention.

The embodiment of FIG. 3 is similar to that of FIG. 2, except that the length of the bypass channel 33 is substantially eliminated. In addition, the bypass channel may optionally begin directly from exhaust manifold 21 instead of exhaust channel 28, if desired, such as will be described in more detail with reference to FIG. 5.

Figure 4:
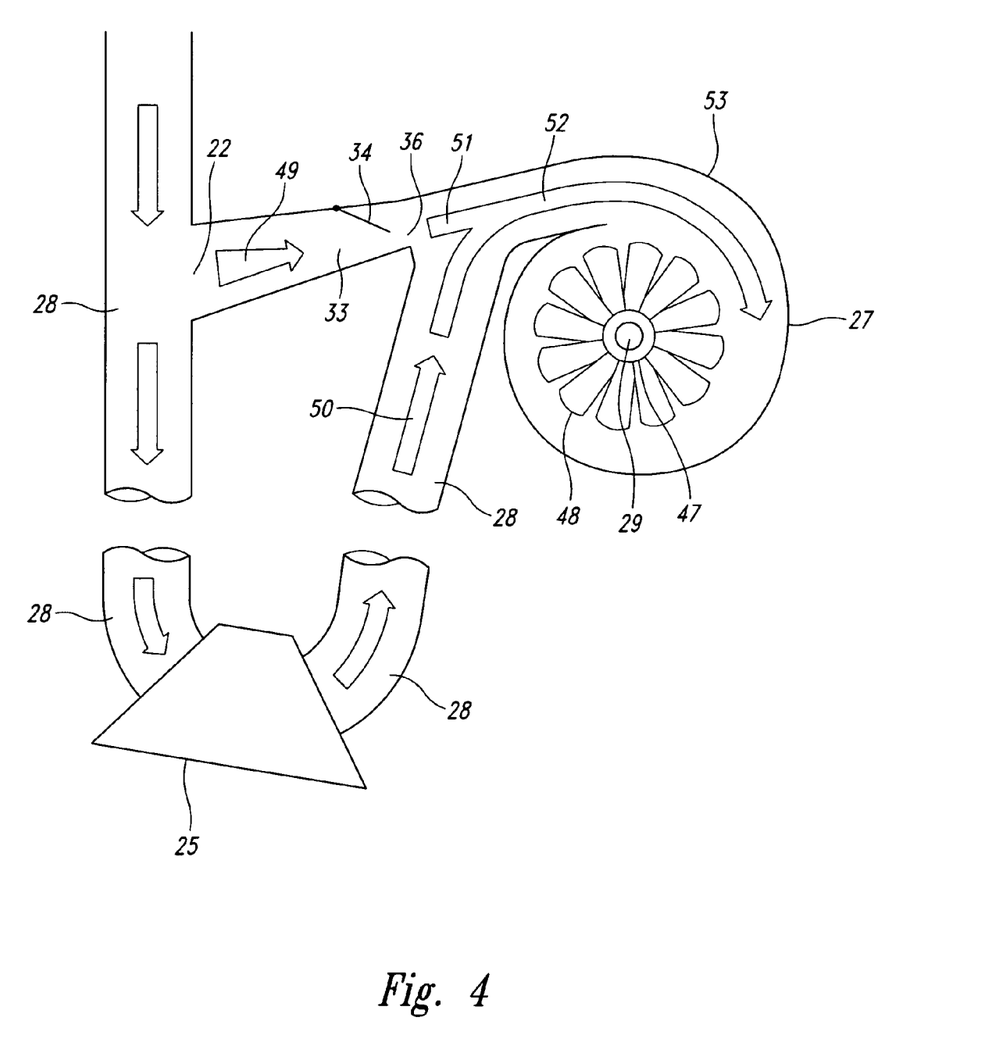
FIG. 4 is a more detailed view of the turbocharging and bypass arrangement of the embodiment of FIG. 3.

FIG. 4 illustrates in more detail an embodiment in which the accelerated bypass flow 51 is reunited with the main exhaust flow 50 prior to contacting to the turbine wheel blades of turbine 27 as discussed with reference to FIGS. 2 and 3 above. As shown in FIG. 4, bypass exhaust flow 49 in bypass channel 33 passes through valve 34 in a reduced cross-section (nozzle) area of bypass channel 33 and/or port 36, which produces an accelerated bypass exhaust flow 51. Accelerated bypass exhaust flow 51 then combines with the lower velocity main exhaust flow 50 in exhaust channel 28 (or, alternatively, within the turbine 27 itself), forming combined exhaust flow 52. Combined exhaust flow 52 then hits the turbine blades 48 at an angle selected to cause turbine wheel 47 to spin, as is known in the art.

It should be noted that, in combining with main exhaust flow 50, some of the velocity of the bypass exhaust flow 51 will be imparted to the slower main exhaust flow 50. This does not necessarily represent a net loss of energy, inasmuch as the energy surrendered by the bypass exhaust flow 51 is transferred to the main exhaust flow 50. Accordingly, terms that refer to preserving velocity, for example, when used in the specification or claims to refer to bypass gases, may also refer to a transfer of a portion of the velocity of one gas flow to another.

Figure 5:
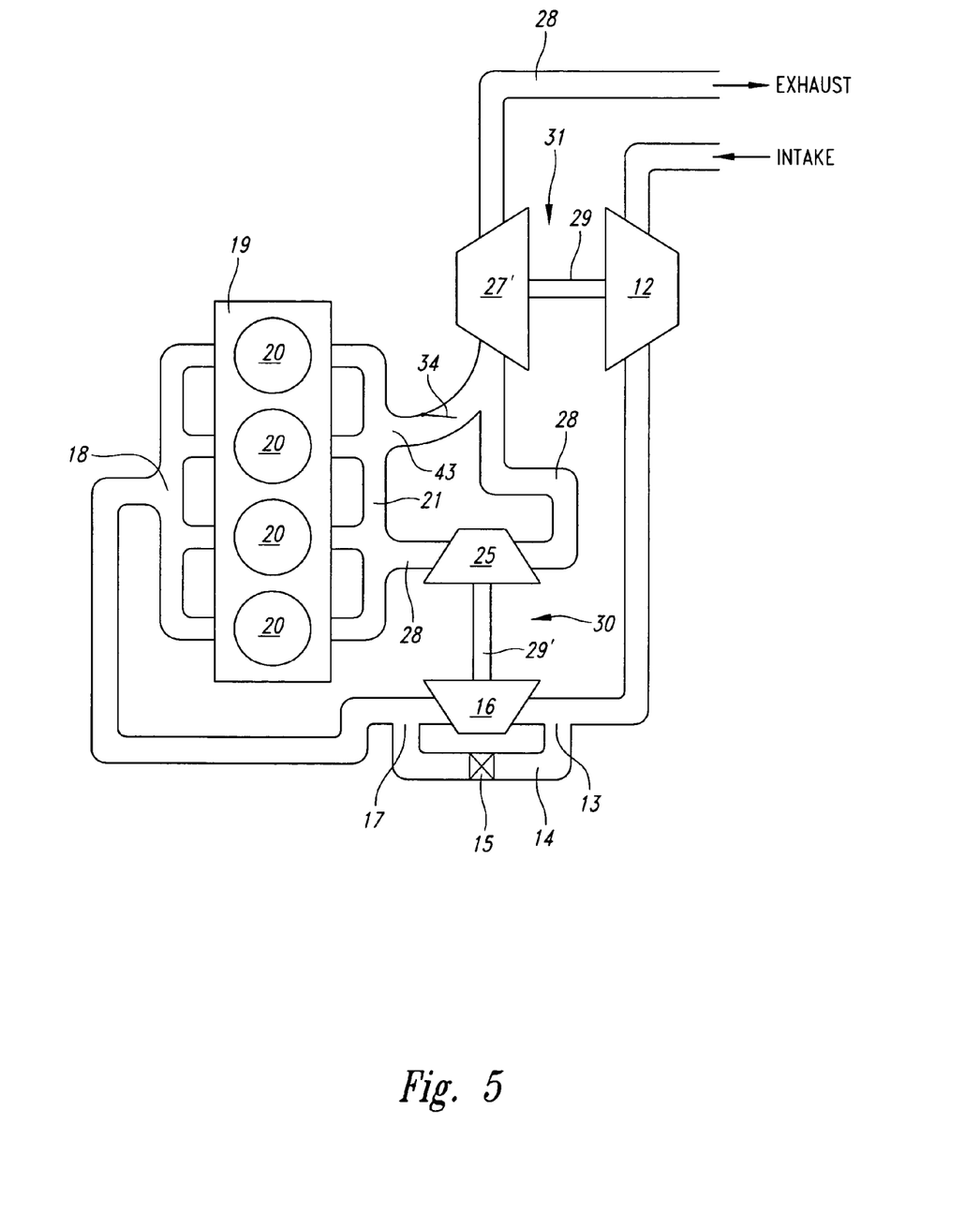
FIG. 5 is a schematic diagram of an internal combustion engine system with turbocharging and bypass arrangements according to another embodiment of the present invention.

FIG. 5 illustrates an alternative embodiment in which bypass channel 43 is connected directly to exhaust manifold 21, instead of to exhaust channel 28. In this manner, bypass channel 43 may be shortened to be no more than a direct fluid connection between exhaust manifold 21 and an inlet to low pressure turbine 27 with bypass valve 34 positioned therein.

In the embodiments described with reference to FIGS. 2 though 5 above, it has been disclosed that valve 34 in the bypass channel may function in the present invention as both (i) a regulating valve to proportionally control bypass flow, and (ii) as a nozzle that focuses and accelerates the bypassed exhaust flow. Alternatively, separate valve and nozzle structures may be used (e.g., with an on/off valve just upstream of the nozzle). According to an embodiment of the invention, a valve/nozzle with variable geometry capability, for focusing and accelerating the bypassed exhaust flow, is provided, to extend the system's benefits and effectiveness over a wider range of engine operation and to appropriately adapt with proportionality to incremental changes in the system's exhaust flow characteristics.

Figure 6:
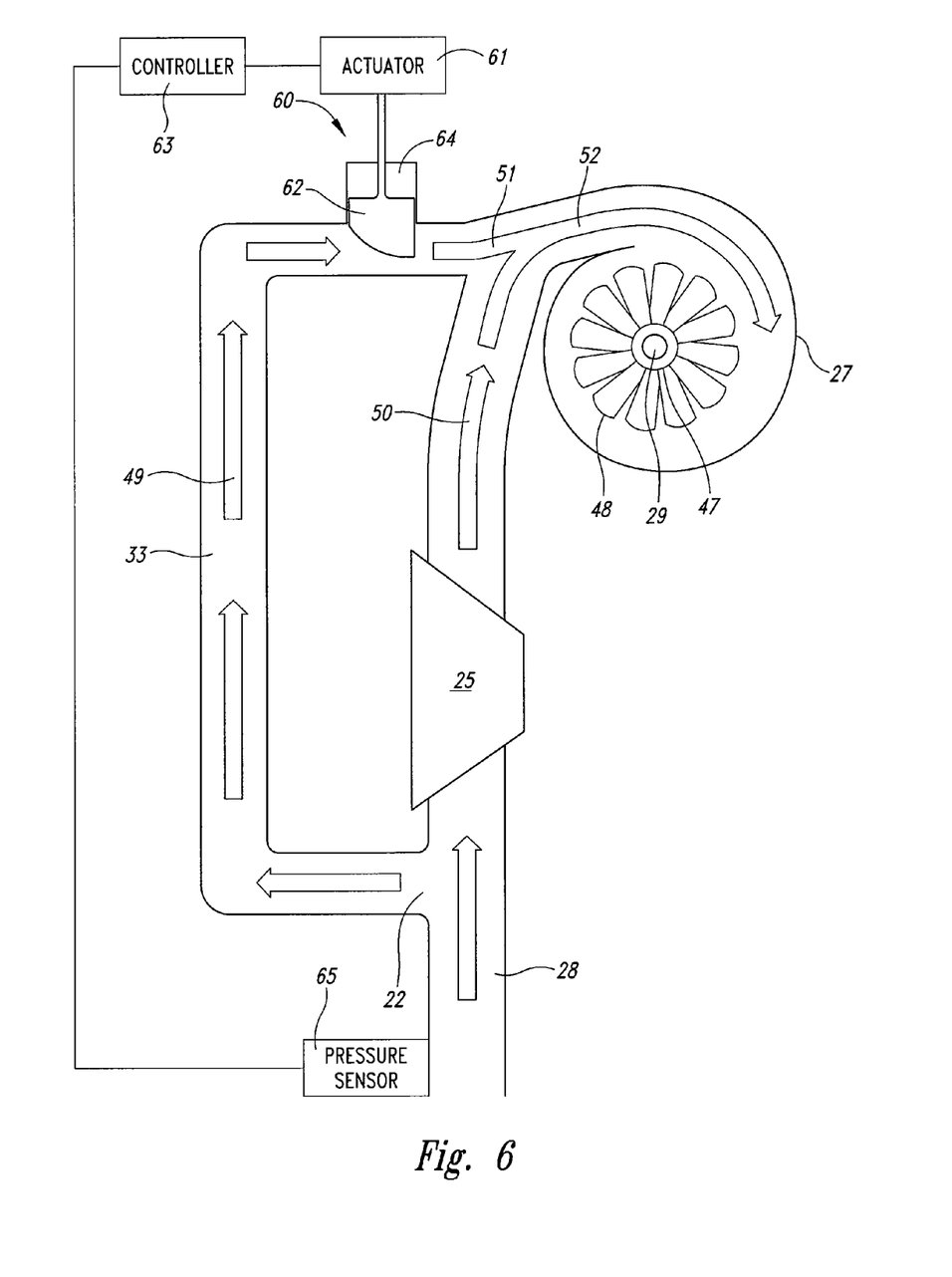
FIG. 6 is a schematic diagram of a turbocharging and bypass arrangement according to another embodiment of the present invention.

Referring now to FIG. 6, an embodiment of the invention is illustrated in which a variable geometry bypass valve 60 is shown. The variable geometry bypass valve 60 includes a sliding valve member 62 configured to slide within a channel 64. The sliding valve member 62 is configured to slide within the valve channel 64 from a first position, in which the bypass channel 33 is fully closed by the sliding valve member 62, and a second position, in which the sliding valve member 62 is fully retracted within the valve channel 64 such that the bypass channel 33 is unobstructed. The shape of the sliding valve member 62 is selected to concentrate the flow of exhaust gases through the bypass channel 33 as the gases pass the valve member 62. In effect, the sliding valve member 62 cooperates with the opposite wall of the channel 33 to form a nozzle having a variable geometry.

An actuator 61 is configured to move the sliding valve member 62 between the first and second positions. Controller 63 is configured to sense or determine pressure in the exhaust line, via, for example, pressure sensor 65, and control the actuator 61 accordingly.

While exhaust gas pressure in the exhaust channel 28 is below a first threshold, the bypass valve 60 is maintained in a closed position. As the pressure in the exhaust channel 28 rises above the first threshold, the valve 60 begins to open, allowing a portion of the exhaust gases to bypass the high-pressure turbine 25 and flow directly to the low pressure turbine 27. The valve 60 is controlled to respond proportionately to changes in the pressure of the exhaust gasses above the first threshold. In this way, the maximum pressure across the high-pressure turbine 25 remains substantially constant as the exhaust flow from the engine changes.

Because the passage between the sliding valve member 62 and the opposite wall of the bypass channel 33 has a very small area relative to a cross-sectional area of the bypass channel 33 in general, virtually all of the pressure drop occurs at the nozzle of the valve 60. The exhaust gases accelerate as they pass through the partially closed nozzle. The flow of accelerated gases 51 recombines with the exhaust flow 50 exiting from a high-pressure turbine 25 to form a combined flow 52, which then enters the turbine 27.

As pressure in the exhaust channel 28 continues to increase the actuator 61 continues to retract the sliding valve member 62 into the valve channel 64, thereby widening the nozzle, until the exhaust gas pressure exceeds a second threshold, at which point the sliding valve member 62 is fully retracted into the valve channel and the bypass channel 33 is unobstructed.

The actuator 61, controller 63, and pressure sensor 65 are shown in block form only, inasmuch as the design and manufacture of such devices is within the ability of one having ordinary skill in the art. They may be separate components or some or all of them may be combined into a single component.

Selection of the first and second thresholds may be in accordance with any desired criteria. For example, the first threshold may be selected as the pressure at which the high-pressure turbine operates most efficiently. Alternatively, the first threshold may be selected as a pressure corresponding to a maximum desired rpm of the high-pressure turbine, thereby reducing wear and extending turbine life. In some systems, the second threshold may be beyond the operating range of the associated engine. In such a system, the bypass valve will never be fully open, but will always restrict and focus the bypass gas flow to at least some degree. In other systems, there may be an extended range of operation beyond the second threshold, in which the bypass valve stands fully open and exhaust gasses pass unimpeded. Selection and manipulation of criteria for establishing the first and second thresholds are within the abilities of one having ordinary skill in the art.

Control of a bypass valve may be passive, in which increasing pressure in the exhaust line overcomes a spring resistance, for example, to cause the valve to open to a greater or lesser degree, in accordance with the level of pressure in the exhaust line. The control may be active, as when a sensor is provided in the exhaust path and a circuit or module monitors a signal provided by the sensor to control operation of the valve.

Alternatively, the valve may be controlled in response to signals from sensors other than an exhaust gas pressure sensor. For example, engine rpm in combination with information on engine load may be used to calculate an exhaust gas pressure. According to some embodiments, the valve may be controlled based on calculations or lookup tables derived from other sensor signals or engine data, and the exhaust pressure may not even be calculated or measured. Nevertheless, for the purposes of this specification and claims, all of the above examples are considered to be different methods of determining exhaust gas pressure, if the result is that valve position correlates at least somewhat to exhaust pressure.

In the embodiments described in the present specification, control of the bypass valve is generally described with reference to exhaust gas pressure in the manifold or exhaust channel. It will be understood by one of ordinary skill in the art that that control of an exhaust bypass system may also or alternatively be in response to other parameters, such as, for example, mass flow rate or exhaust gas velocity. Accordingly, while pressure is the operating parameter recited in the accompanying claims, other operating parameters, including those mentioned above, are considered equivalent, and thus fall within the scope of the claims, as well.

Figure 7:
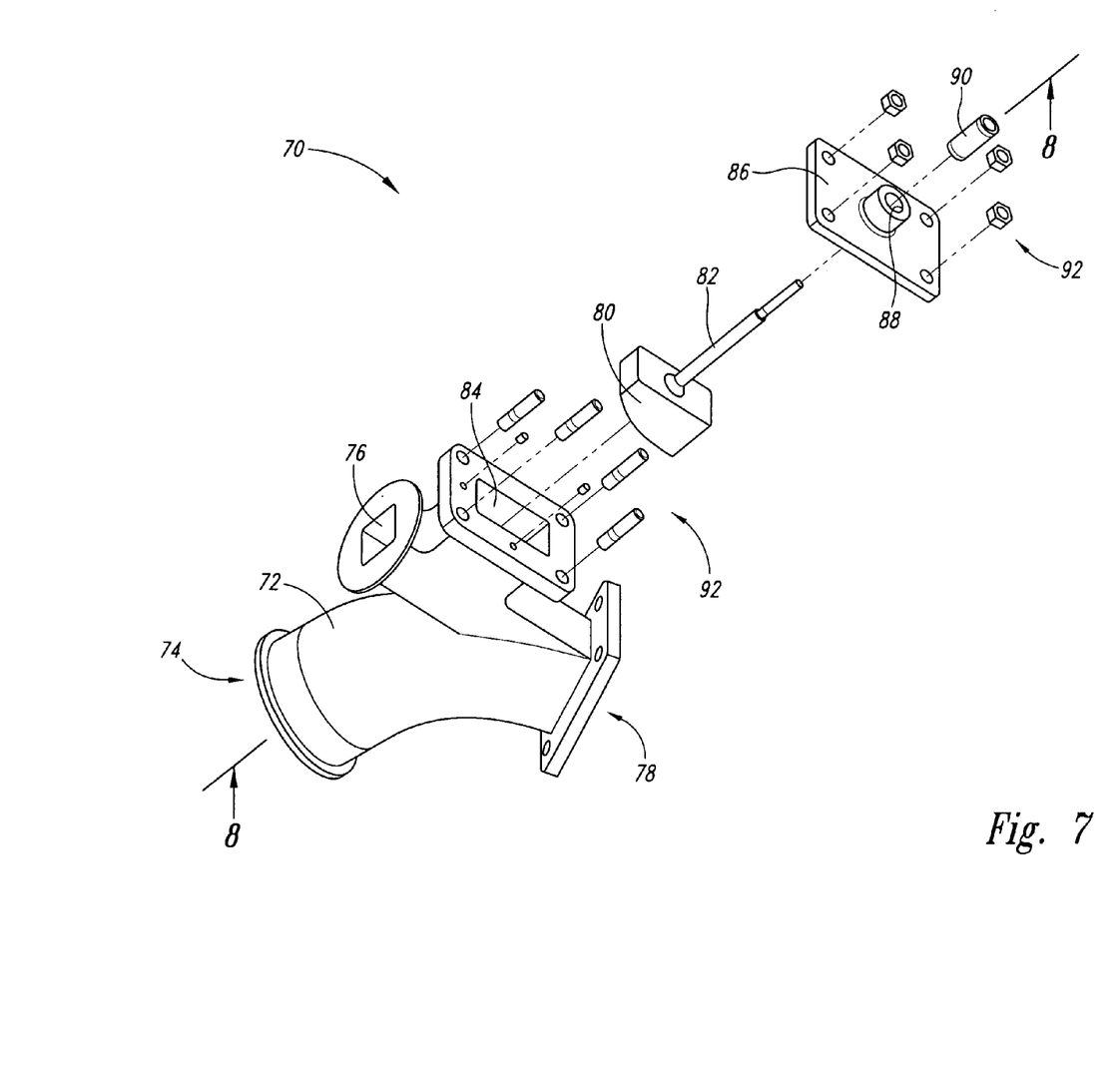
FIG. 7 is an exploded isometric view of a bypass valve according to an embodiment of the present invention.
Figure 8A:
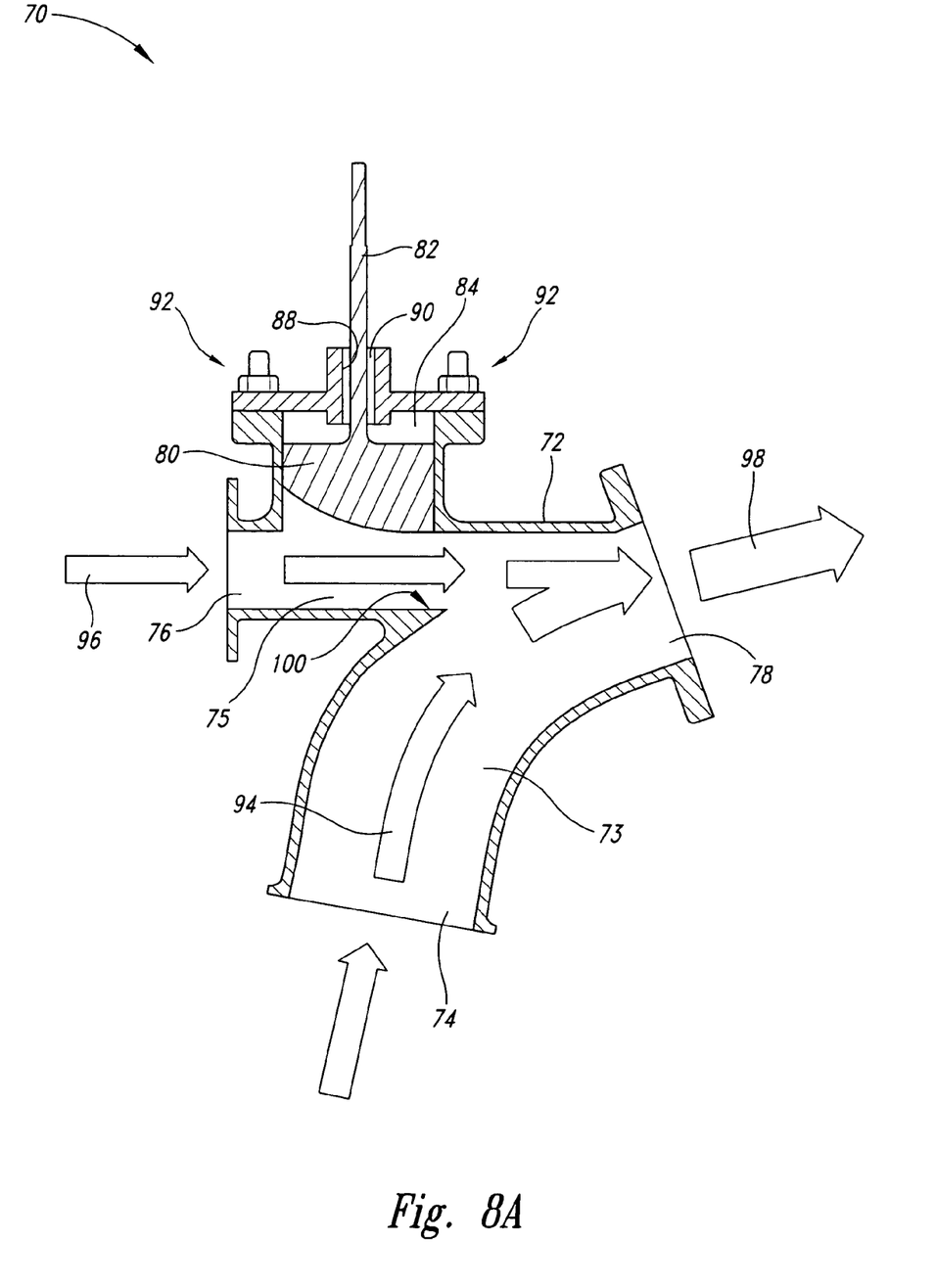
FIGS. 8A and 8B are cross-sectional views of the valve of FIG. 7, taken along lines 8-8.
Figure 8B:
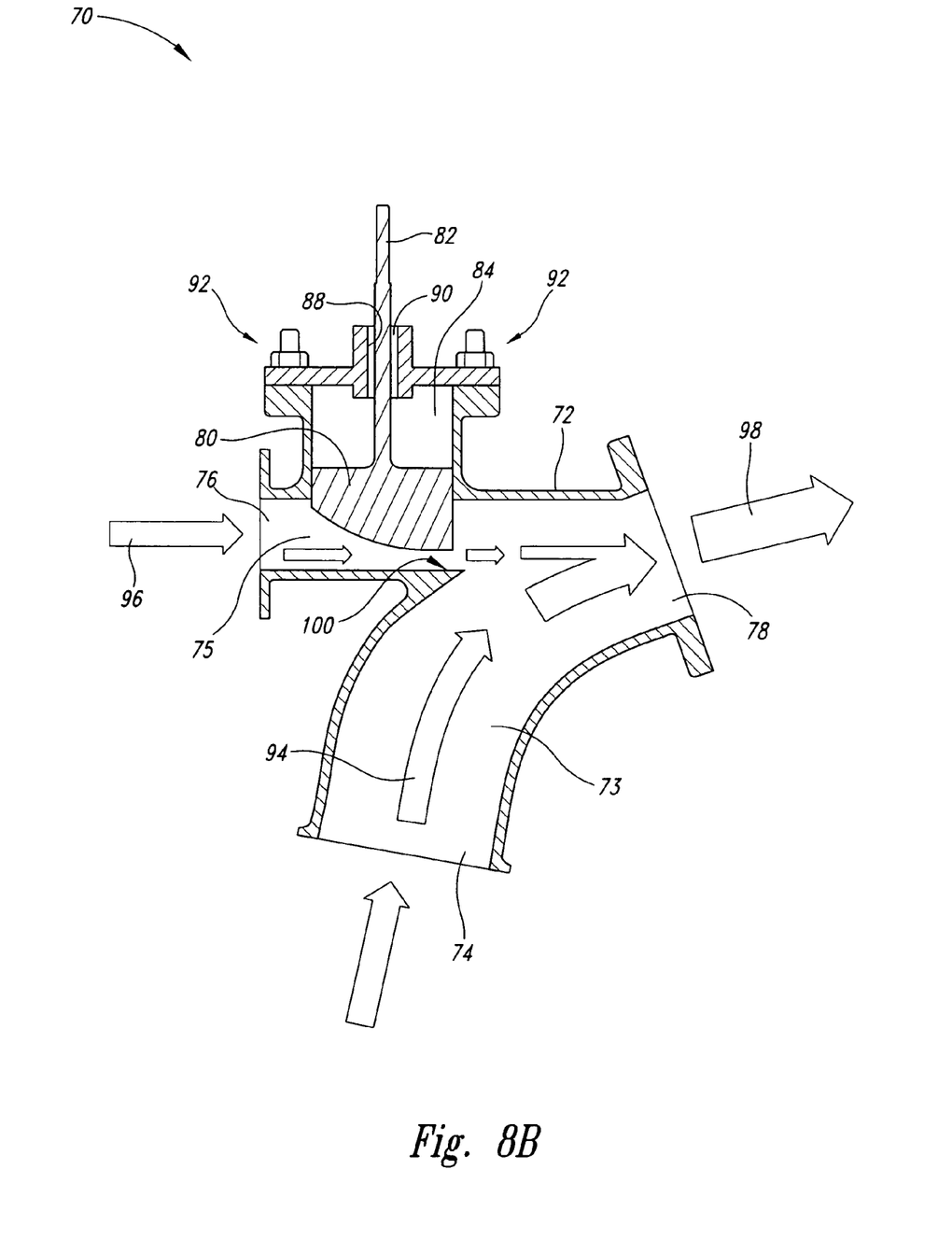

Referring now to FIGS. 7-8B, a gate-valve type bypass valve 70 is shown. FIG. 7 shows the valve 70 in an exploded view, while FIGS. 8A and 8B show a cross-section taken substantially along lines 8-8 of FIG. 7. The valve 70 includes a valve body 72 having a first passage 73 extending between a first inlet 74 and an outlet 78, and a second passage 75 extending between a second inlet 76 and the outlet 78. A sliding valve member 80 is positioned within a valve channel 84, and is provided with an actuator rod 82. A guide plate 86 is configured to be coupled to the valve body 72 over the valve channel 84 and includes an aperture 88 through which the actuator rod 82 passes. A bushing 90 is positioned within the aperture 88 between the guide plate 86 and the actuator rod 82 of the sliding valve member 80. Fasteners are indicated generally by reference numeral 92.

The bypass valve 70 is configured to receive a first stream 94 of exhaust gases into the first passage 73 via the first inlet 74 and a second stream 96 of exhaust gases into the second passage 75 via the second inlet 76. The first and second streams 94, 96 of exhaust gases entering the valve 70 join into a single stream 98 of exhaust gases which exits the valve 70 via the outlet 78. The sliding valve member 80 is configured to move between a fully closed position, in which passage of the second stream 96 of exhaust gases in the second passage 75 is fully blocked, to a second position, in which the sliding valve member 80 is fully retracted into the valve channel 84, as shown in FIG. 8A, so as to provide no obstruction to the second stream 96. The shape of the sliding valve member 80 is selected such that the valve member 80 cooperates with a wall 100 of the valve body 72 to function as a nozzle to concentrate the flow of gases therebetween, to increase a velocity and minimize turbulence of the second stream 96, and to focus the stream 96 as it joins with stream 94 near the outlet 78 of the valve 70. FIG. 8B shows the sliding valve member 80 in a partially closed position, in which the second stream 96 is substantially restricted.

In the illustrated embodiment, the second passage 75 is straight, between the second inlet 76 and the outlet 78 to minimize energy loss due to changes in direction. Additionally, the geometry of the valve body 72 and the sliding valve member 80 are selected to combine the first and second streams 94, 96 with as little turbulence as possible, so that the combined stream 98 retains a high energy level.

Figure 9:
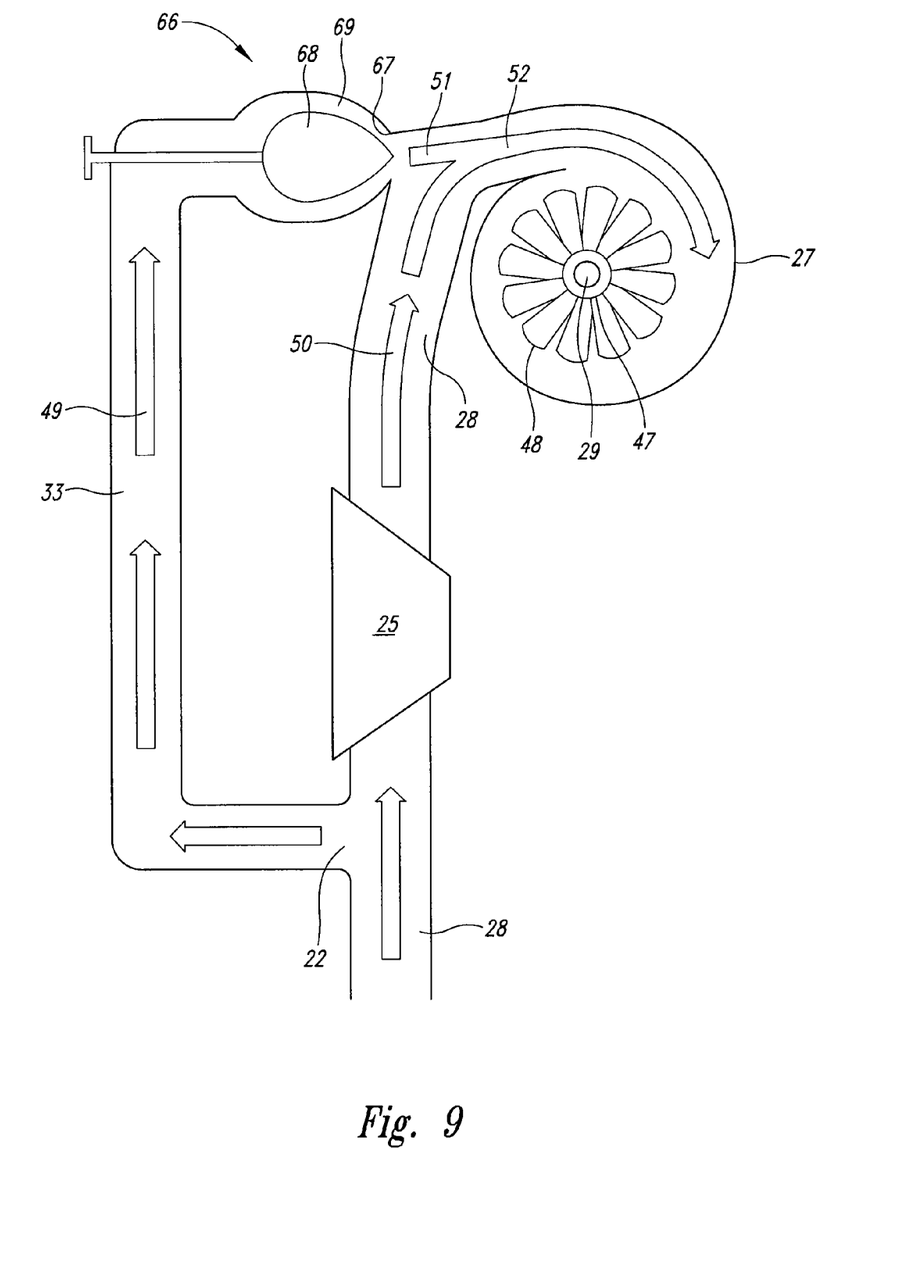
FIG. 9 is a schematic diagram of a turbocharger bypass arrangement according to a further embodiment of the present invention.

Referring now to FIG. 9, an embodiment of the invention is shown in which what will be referred to herein as a venturi-type valve 66 is positioned in the bypass channel 33 at the point where the bypass channel 33 rejoins the exhaust channel 28. The bypass valve 66 includes a valve member 68 positioned within a valve chamber 69. The valve member 68 is configured to move between a fully closed position, in which the valve member 68 contacts a valve seat 67, and a fully open position in which the valve member 68 is withdrawn into a substantially central position in the valve chamber 69. While the valve member 68 is in the open position, exhaust flow 49 in the bypass channel 33 is free to flow around the valve member 68 unimpeded and flow into the exhaust channel 28. As the valve member 68 moves toward the closed position, the shape of the valve member 68, in cooperation with the shape of the valve seat 67, progressively restricts the flow of the exhaust flow 49, while directing the exhaust into a focused stream as it enters the exhaust channel 28.

According to another embodiment, the valve 66 is a true venturi valve in which the outlet of the valve chamber 69 has a constricted size, relative to the exhaust channel 33, such that, when fully open, the valve 66 accelerates and focuses gas flowing therethrough.

Embodiments of the present invention provide several benefits over previously known multi-stage turbocharger systems. For example, in typical prior art systems, there is a significant drop in efficiency in the midrange of operation while a wastegate is partially open. This means, for example, that as an engine employing such a system accelerates through this range, there is either a power drop, a reduction in fuel to charge-mass ratio, or a drop in fuel efficiency to compensate. If the engine operates extensively in this range, such as may occur during normal city and freeway operation, the overall benefits and efficiency of the turbocharger system are greatly reduced.

Embodiments of the present invention can mitigate this drop to a large extent, and provide increased fuel and energy efficiency in the midrange of operation.

Prior art systems designed to meet a minimum required level of efficiency in the midrange of operation, are overproductive in the high- and low-ranges, putting a higher load on the engine than would be otherwise necessary.

Because turbocharger systems according to embodiments of the present invention have an increased efficiency in the midrange, the high- and low-range operating characteristics can be much closer to actual engine requirements, which improves the engine performance in those ranges as compared to the prior art. This, in turn, increases the overall fuel economy of the engine without sacrificing power.

Finally, since the more efficient systems according to embodiments of the present invention can be reduced in overall load requirements, this may translate into a reduction in size and weight of the turbocharger, which further improves vehicle efficiency and simplifies engine compartment arrangement.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method, comprising:
transmitting a first flow of exhaust gas from an exhaust manifold to a first turbine;
transmitting a second flow of exhaust gas from the exhaust manifold to a second turbine when a level of exhaust pressure in the manifold exceeds a threshold;
regulating the second flow of exhaust gas to the second turbine in direct relation to the level of exhaust pressure above the threshold;
converting pressure energy in the second flow to kinetic energy in the form of increased velocity of the stream; and
introducing the second flow of exhaust gas to the second turbine while a substantial portion of the converted energy remains in the second flow.

2. The method of claim 1, further comprising transmitting the first flow of exhaust gas from the first turbine to the second turbine.

3. The method of claim 2, further comprising combining the first and second flows into a single flow prior to introducing the first and second flows into the second turbine.

4. The method of claim 1 wherein the regulating and converting steps are performed through the use of a valve configured to function as a variable geometry nozzle.

5. The method of claim 1 wherein the regulating step further comprises regulating the second flow of exhaust gas such that a pressure drop across the first turbine remains substantially constant, at least while the exhaust pressure lies within a range above the threshold.

6. A turbocharger bypass valve, comprising:
a valve body having a first passage extending between a first gas inlet and a gas outlet, and a second passage extending between a second gas inlet and the gas outlet, the first and second passages configured such that gas streams entering the first and second inlets are combined into a single gas stream exiting the gas outlet;
a valve member actuable between a closed position in which the valve member substantially blocks all gas flow in the second passage and an open position in which the valve member is retracted, leaving the second passage unobstructed, such that gas flowing in the second passage is substantially unimpeded by the valve member, the valve member configured to direct gas flowing in the second passage in a substantially focused stream toward the outlet; and
a control mechanism configured to control actuation of the valve member according to a pressure level at the second gas inlet.

7. The valve of claim 6 wherein the control mechanism is configured to:
maintain the valve member in the closed position while the pressure level is below a first threshold;
move the valve member toward the open position when the pressure level exceeds the first threshold; and
maintain the valve member in the open position while the pressure level exceeds a second threshold, greater than the first threshold.

8. The valve of claim 6 wherein the valve member cooperates with a portion of the second passage to form a variable geometry nozzle.

9. The valve of claim 6 wherein the second passage is straight between the second inlet and the outlet.

10. The valve of claim 6 wherein the valve is a gate-type valve.

11. The valve of claim 6 wherein the valve is a venturi-type valve.

12. The valve of claim 6 wherein the first and second passages merge according to an orientation and configuration selected to preserve kinetic energy of the gas stream that enters the second inlet as it combines with the gas stream that enters the first inlet.

13. A turbocharger bypass valve, comprising:
a valve body having a first passage extending between a first gas inlet and a gas outlet, and a second passage extending between a second gas inlet and the gas outlet, the first and second passages configured such that gas streams entering the first and second inlets are combined into a single gas stream exiting the gas outlet;
a gate-type valve member actuable between a closed position in which the valve member substantially blocks all gas flow in the second passage and an open position in which the gas flowing in the second passage is substantially unimpeded by the valve member, the valve member configured to direct gas flowing in the second passage in a substantially focused stream toward the outlet; and
a control mechanism configured to control actuation of the valve member according to a pressure level at the second gas inlet.

14. A system, comprising:
a first turbine having an inlet and an outlet;
a second turbine having an inlet in fluid communication with the outlet of the first turbine, and an outlet;
bypass means for passing a gas flow to the inlet of the second turbine without passing through the first turbine; and
means for preserving a portion of an energy potential released as pressure of the gas flow drops in the bypass means.

15. The system of claim 14, further comprising control means for variably controlling a volume of the gas flow in accordance with a gas pressure level at the inlet of the first turbine.

16. A system, comprising:
a first turbine having an inlet and an outlet;
a bypass channel having a first end in fluid communication with the inlet of the first turbine and a second end in fluid communication with the outlet of the first turbine, and configured to provide a bypass for a flow of gaseous fluid around the first turbine;
a second turbine having an inlet in fluid communication with the outlet of the first turbine and the second end of the bypass channel, and an outlet; and
a valve positioned in the bypass channel and configured to regulate a flow of gaseous fluid in the bypass channel, the valve further configured to increase a velocity of a stream of the gaseous fluid passing therethrough, and focus the stream toward the inlet of the second turbine such that the increased velocity of the stream of fluid is substantially preserved as it enters the second turbine.

17. The system of claim 16 wherein the stream of fluid is combined with an additional stream of gaseous fluid from the outlet of the first turbine, and wherein a portion of the increased velocity of the first stream of fluid is imparted to the additional stream of fluid.

18. The system of claim 16 wherein the valve is a gate-type valve.

19. The system of claim 16 wherein the valve is a venturi-type valve.

20. The system of claim 16, further comprising an actuator configured to vary a geometry of the valve between a closed position, in which passage of fluid in the bypass channel is substantially blocked, to an open position, in which passage of fluid in the bypass channel is substantially unimpeded.

21. The system of claim 20, further comprising a controller configured to control the actuator in response to a level of fluid pressure at the inlet of the first turbine.

22. The system of claim 21 wherein the controller and actuator are collectively configured to maintain the geometry of the valve in the closed position while the pressure is below a first threshold, to progressively vary the geometry toward the open position as the pressure increases above the first threshold, and to maintain the valve in the open position while the pressure is above a second threshold.

23. The system of claim 21 wherein the controller includes a pressure sensor positioned in an exhaust path in fluid communication with the inlet of the first turbine.

24. The system of claim 21 wherein the level of fluid pressure is calculated based on operating values of an engine.

25. The system of claim 20 wherein the controller and actuator are collectively configured to vary the geometry of the valve so as to maintain substantially constant a pressure drop across the first turbine while total fluid flow through the first turbine and the bypass channel changes, at least within a range of operation.

26. The system of claim 16, further comprising first and second compressors operatively coupled to the first and second turbines, respectively.

27. The system of claim 26 wherein an output of the second compressor is in fluid communication with an input of the first compressor.

28. The system of claim 16, further comprising:
an internal combustion engine;
an exhaust manifold coupled to the engine and configured to receive exhaust gases from combustion cylinders of the engine; and
an exhaust channel having a first end coupled to an outlet of the exhaust manifold and a second end coupled to the inlet of the first turbine.

29. The system of claim 28 wherein the inlet of the second turbine is coupled to a bypass port of the exhaust channel.

30. The system of claim 28 wherein the inlet of the second turbine is coupled to an additional outlet of the exhaust manifold.

31. A turbocharger system, comprising:
a first turbine having an inlet configured to be coupled to an exhaust system of an internal combustion engine, and an outlet;
a bypass channel having a first end in fluid communication with the inlet of the first turbine and a second end in fluid communication with the outlet of the first turbine;
a second turbine having an inlet in fluid communication with the outlet of the first turbine, and an outlet; and
bypassing means for bypassing a portion of exhaust gases in the exhaust system past the first turbine in direct relation to a pressure level of the exhaust gases in the exhaust system, for converting a drop in pressure in the bypassed portion to an increase in velocity of the bypassed portion, and for directing the bypassed portion in a focused stream toward the inlet of the second turbine.

* * * * *